4 Sheets—Sheet 1.

T. G. GOODFELLOW.
Oil-Stove.

No. 211,091. Patented Jan. 7, 1879.

Witnesses:

Inventor:
Thomas G. Goodfellow

T. G. GOODFELLOW.
Oil-Stove.
No. 211,091.    Patented Jan. 7, 1879.
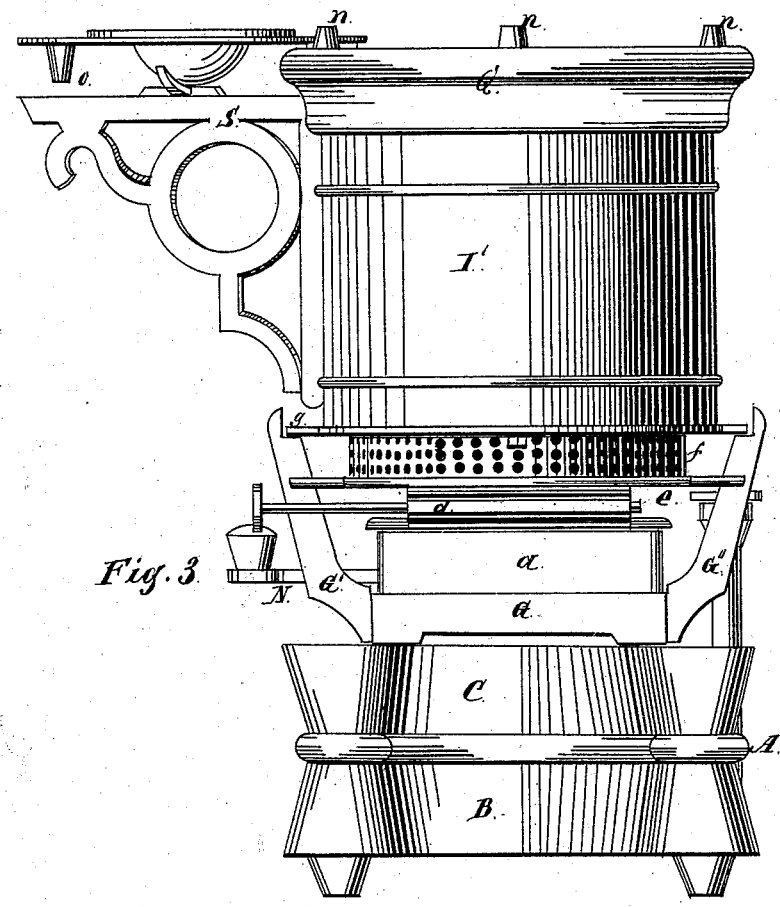
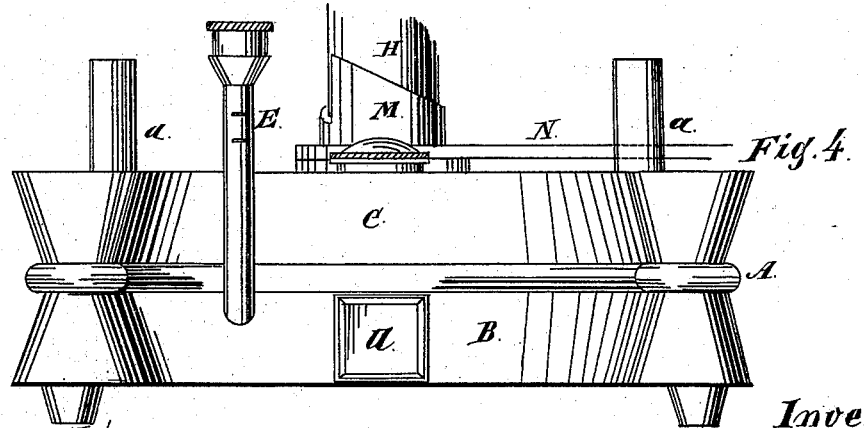

4 Sheets—Sheet 3.
T. G. GOODFELLOW.
Oil-Stove.
No. 211,091. Patented Jan. 7, 1879.
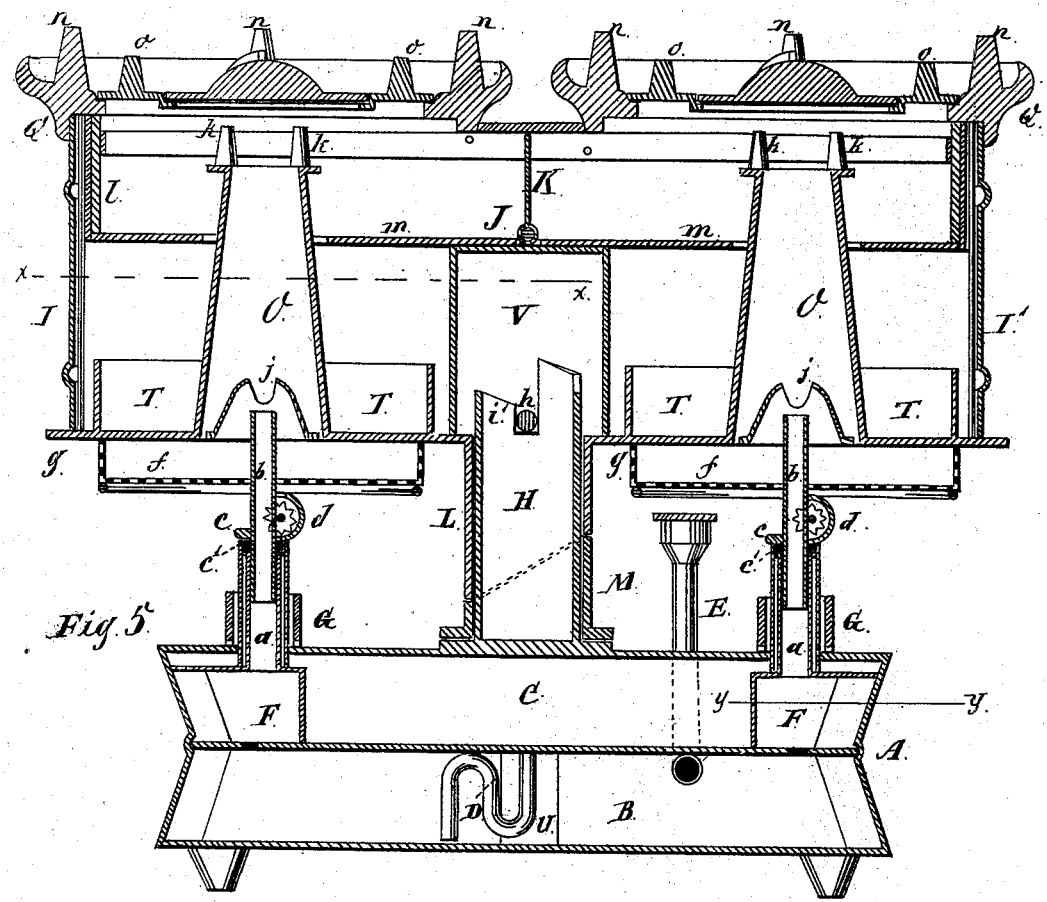
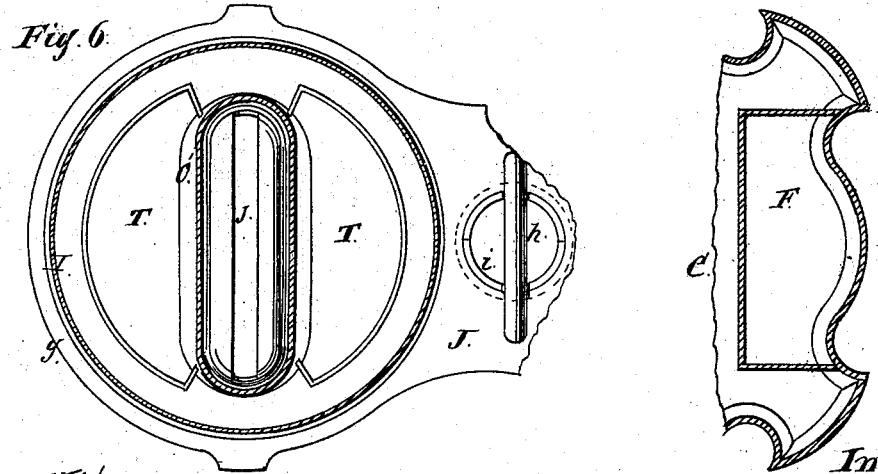
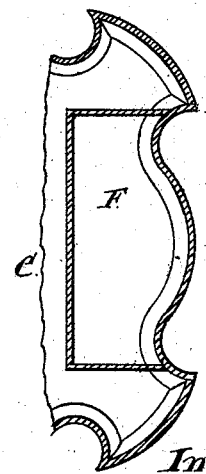
Witnesses:
Inventor:
Thomas G. Goodfellow 4 Sheets—Sheet 4.
T. G. GOODFELLOW.
Oil-Stove.
No. 211,091. Patented Jan. 7, 1879.
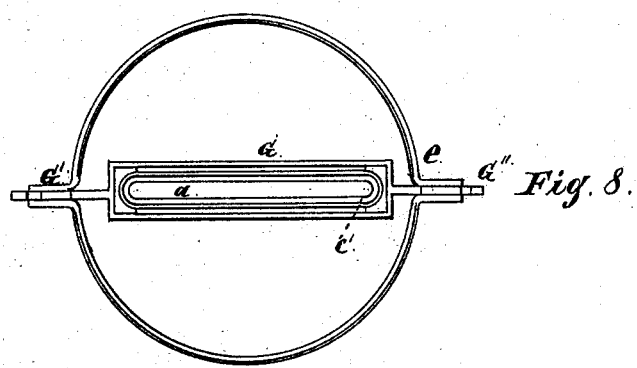
Fig. 8.
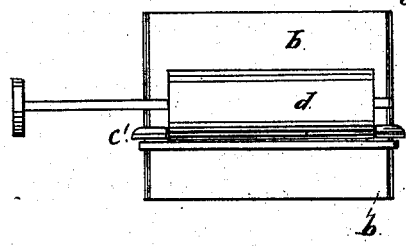
Fig. 9.
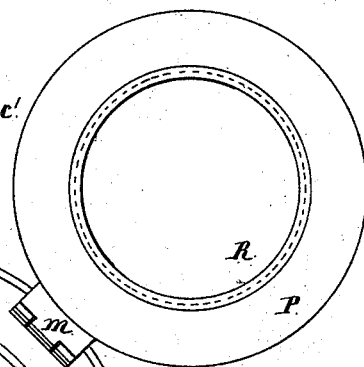
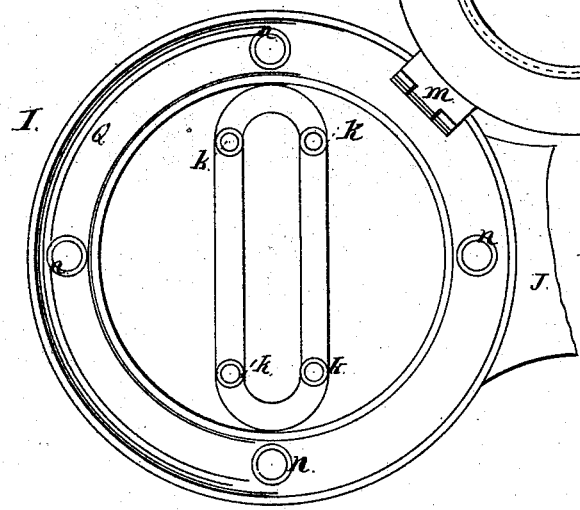
Fig. 10.
Witnesses:
Inventor:
Thomas G. Goodfellow

UNITED STATES PATENT OFFICE.

THOMAS G. GOODFELLOW, OF CHICAGO, ILLINOIS.

IMPROVEMENT IN OIL-STOVES.

Specification forming part of Letters Patent No. 211,091, dated January 7, 1879; application filed May 10, 1878.

*To all whom it may concern:*

Be it known that I, THOMAS G. GOODFELLOW, of Chicago, Cook county, State of Illinois, have invented new and useful Improvements in Oil-Stoves, of which the following is a full description, reference being had to the accompanying drawing, in which—

Figure 1:
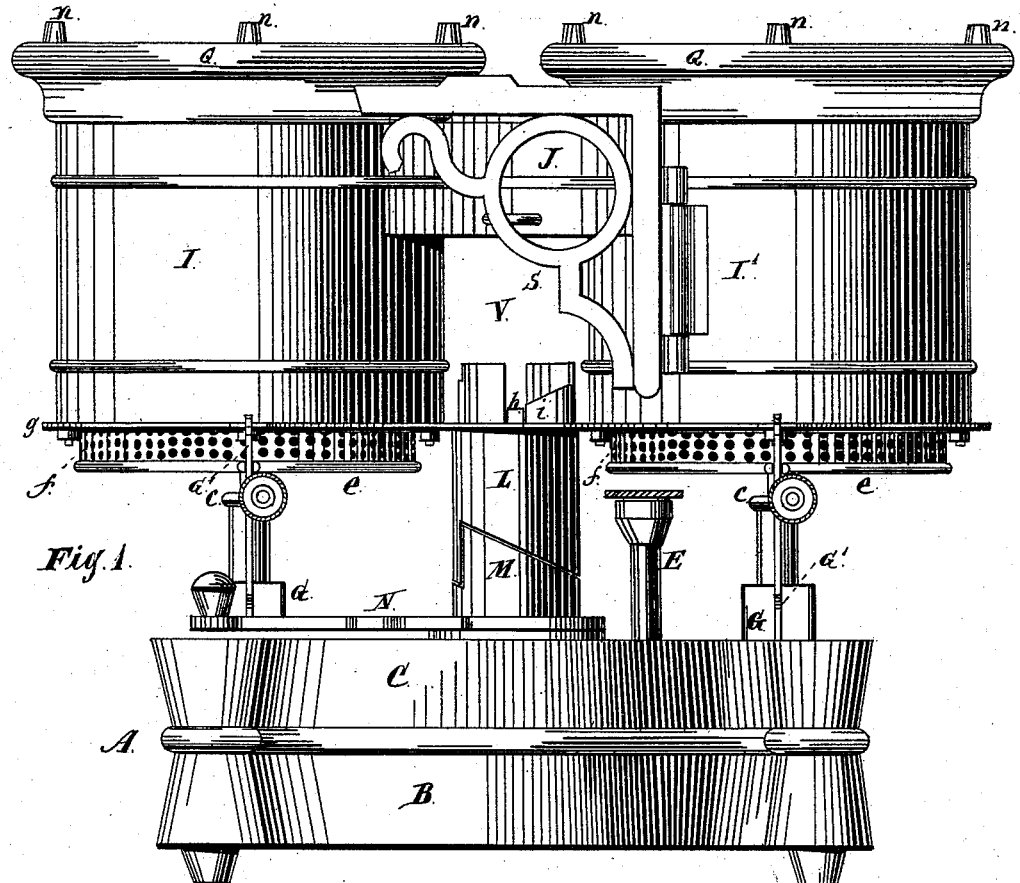
Figure 2:
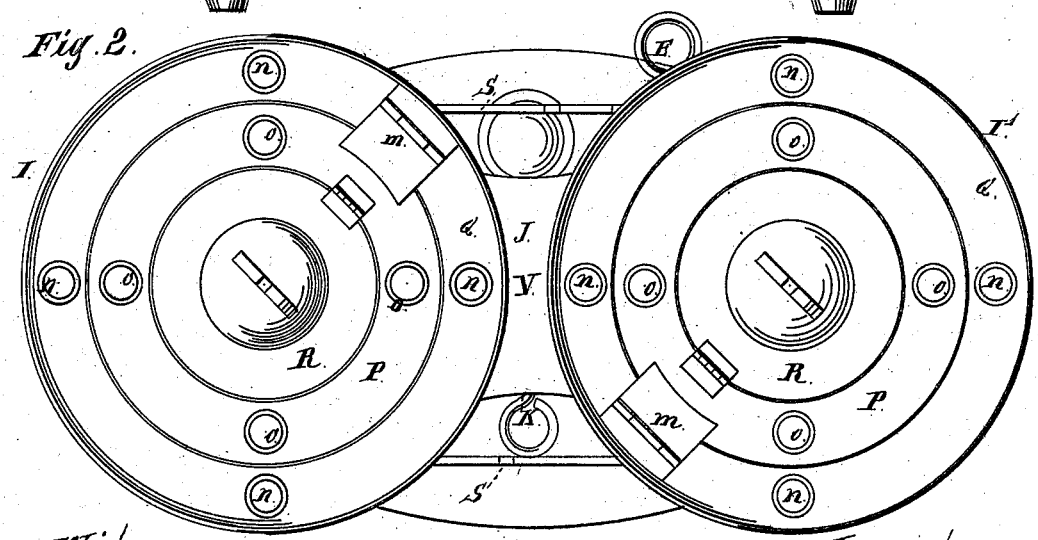

Figure 1 is a front elevation; Fig. 2, a plan; Fig. 3, an end elevation; Fig. 4, a rear view of the parts shown; Fig. 5, a central vertical longitudinal section; Fig. 6, a horizontal section at $x$ of Fig. 5; Fig. 7, a horizontal section at $y$ of Fig. 5; Fig. 8, a plan of the burner and other parts shown; Fig. 9, a side elevation of the burner; Fig. 10, a plan of one of the cylinders, showing the hinged ring and cover open.

In the drawings, A represents a base, which is hollow, and is divided into two chambers by a horizontal partition. The lower chamber, B, is for oil, and the upper chamber, C, is for water. There is a communication between the two chambers by means of the bent tube D.

E is a filling-tube, which is graduated on the outside to indicate the density of the oil used.

F is a wick-chamber, one at each end of the water-chamber. In this chamber F there is room for a quantity of wick; but if the wick escapes from the burner it will fall into this chamber F, and cannot pass into the oil-chamber B. Oil passes into the wick-chamber through one or more holes in the partition between the oil and water chambers; but water cannot pass into F from chamber C.

The wick-tube consists of two parts, $a$ $b$. The lower part, $a$, is permanently secured to the top of the chamber F, which has an opening to receive the wick. This part $a$ of the wick-tube may be cast with the chamber F. $b$ is the other part of the wick-tube. Its lower end is inserted in the lower portion, $a$, of the wick-tube. $c$ is a shoulder on $b$, which rests on the top of $a$, and $c'$ is a packing of rubber or other suitable material. I prefer to make the lower part, $a$, of the wick-tube double. $d$ is the wick-ratchet. G is a collar, which is placed around the wick-tube, and G' G'' are arms secured to the collar G. These arms are notched at their upper ends, and upon them the ends of the stove-body V are supported.

$e$ is a wire ring secured to the arms G' G'', upon which ring the perforated plate $f$ rests. H is a standard secured to the base A. It may be hollow.

As represented, the stove-body V consists of two cylinders, I I', secured to a base-plate, $g$, at their lower ends. These cylinders are connected together at their upper ends by a passage, J, in which is a damper, K. For some purposes a single oblong drum might be used in place of the two cylinders I I', forming the main wall; but the two cylinders will usually be the best form.

The base-plate $g$ of the stove-body V has a central opening, surrounding which, and attached to the plate $g$, is a collar, L, which fits over the standard H. It is shorter than this standard, and its lower end has two inclines, as shown in the drawings.

M is a loose collar also fitting the standard H, and its upper end corresponds in form with the lower end of L. N is a handle or lever secured to M, by means of which it can be rotated for the purpose of raising the stove-body V. $h$ is a rod or bar secured over the central opening mentioned in the plate $g$, and fitting into notches in the upper end of H. A portion of the top of H, on each side, is inclined, as shown in Fig. 1 at $i$, also in Fig. 5 at $i'$. The remaining portions of the top of H form stops, against which the bar $h$ strikes when the drum is rotated.

O O are chimneys, one in each cylinder, over the wick-tubes and cones $j$ $j$. On the tops of the chimneys are studs $k$ to prevent any utensil from being placed directly upon the top of the chimney, which would interfere with the draft.

$m$ is a partition-plate, with openings around the chimneys. $l$ is an asbestus lining for the purpose of aiding in retaining the heat in the chambers above the partition $m$. Each cylinder is provided with a rim, Q, at the top. $n$ are studs projecting above the rim Q.

P is a ring, hinged to the rim or top Q of the cylinder. R is a cover, hinged, as shown, to the hinged ring P, and adapted to close the opening in the ring. S is a bracket, hinged, one to each cylinder, to support the ring and cover P R when the same are thrown back, as shown in Fig. 10. $o$ are studs on P. T are water-receptacles, located upon the plate g within the cylinders, and outside of the chimneys. U is a piece of glass, set into the chamber B, through which the quantity or oil in the reservoir can be observed.

In manufacturing, I cast the plate g, chimneys O, and collar L together, forming a single piece. The water-receptacles T may also be cast with the plate g.

In use, a suitable quantity of water or other fluid heavier than oil is to be poured into the lamp, which will flow into B. Oil is then poured into E, which flows into B and forces the water up into C through D. As the oil is consumed the water flows back into B, keeping the oil at about the same height, substantially as described in a former application made by me for a patent for improvements in hydrostatic lamps.

The wick-chamber F is a desirable feature in connection with the divided wick-tube. If the wick-tube extended down to the chamber B, the wick would fall into it, should it escape from the wick-tube, from which chamber it would be difficult to withdraw it; but with my construction, if the wick escapes from the burner, it will only fall into the wick-chamber F, from which it can be easily removed by means of a hook, first removing the top of the wick-tube. The pressure of the fluid in C will always force oil into the wick-chamber F.

The stove-body is supported at the center on the standard H, and at the ends by the arms G′ G″. By turning the collar M, by means of lever N, the stove-body V can be raised, so that the plate g will clear the wick-tubes and tops of the arms G′ G″. Then the stove-body can be turned around upon the standard H until the ends are at right angles to the base, in which position ready access can be had to the wick-tubes for the purpose of trimming the wick, removing a wick from the chamber F, or putting in a new wick.

There are two burners and, as shown, two separate cylinders, connected by the passage J, controlled by a damper, K, thus forming, in effect, two stoves, which may be used either separately or together; and, if desired, by covering one cylinder and opening the damper K, a large portion of the heat from both of the burners can be concentrated in the other cylinder.

The ring P and cover R being open, a cooking utensil can be placed either upon the studs k or on the studs n; or, when the ring is closed, a suitable utensil can be placed on the studs o.

I do not, as respects other parts of the apparatus claimed, limit myself to the particular device shown for raising the body V. Indeed, it might be raised directly without the intervention of any lifting device.

What I claim as new is as follows:

1. The stove-body V, centrally supported on a suitable standard, in combination with the collars L and M, all constructed and operating substantially as and for the purposes specified.

2. The combination of the oil-chamber B, wick-chamber F, with stationary wick-tube a and the removable wick-tube b, carrying the wick-raisers, substantially as and for the purposes herein set forth.

3. In an oil-stove, a stove-body consisting of two cylinders, I I′, supported by a suitable base-plate, g, and connected together by a passage, J, provided with a damper, K, substantially as and for the purposes specified.

4. The hinged ring P, in combination with a stove-body or cylinder and hinged bracket S, substantially as specified.

THOMAS G. GOODFELLOW.

Witnesses:
E. A. WEST,
O. W. BOND.